US010533436B2

(12) United States Patent
Niergarth et al.

(10) Patent No.: US 10,533,436 B2
(45) Date of Patent: Jan. 14, 2020

(54) CENTERLINE-MOUNTED HYDRAULIC PITCH CHANGE MECHANISM ACTUATOR

(71) Applicant: General Electric Company, Schenectady, NY (US)

(72) Inventors: Daniel Alan Niergarth, Cincinnati, OH (US); Brandon Wayne Miller, Middletown, OH (US); Darek Tomasz Zatorski, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 872 days.

(21) Appl. No.: 14/932,661

(22) Filed: Nov. 4, 2015

(65) Prior Publication Data
US 2017/0122119 A1 May 4, 2017

(51) Int. Cl.
F01D 7/00 (2006.01)
F01D 5/12 (2006.01)
(Continued)

(52) U.S. Cl.
CPC .................. F01D 7/00 (2013.01); F01D 5/02 (2013.01); F01D 5/12 (2013.01); F01D 15/00 (2013.01);
(Continued)

(58) Field of Classification Search
CPC ......... B64C 11/30; B64C 11/38; B64C 11/48; B64C 11/306; B64D 2027/005; F01D 7/00
(Continued)

(56) References Cited

U.S. PATENT DOCUMENTS 3,873,236 A 3/1975 Gall
4,657,484 A 4/1987 Wakeman et al.
(Continued)

FOREIGN PATENT DOCUMENTS

CN 103119250 A 5/2013
EP 2 500 264 A2 9/2012
(Continued)

OTHER PUBLICATIONS

U.S. Appl. No. 14/873,382, filed Oct. 2, 2015, entitled Variable Pitch Fan for Gas Turbine Engine and Method of Assembling the Same.
(Continued)

Primary Examiner — Carlos A Rivera
Assistant Examiner — Cameron A Corday
(74) Attorney, Agent, or Firm — General Electric; James Reed

(57) ABSTRACT

A method and system for controlling a pitch of blades of a fan assembly having a centerline axis of rotation is provided. The system includes a pitch change mechanism (PCM) including a hydraulic actuator positioned axisymmetric with respect to the fan assembly and configured to angularly displace the blades of the fan assembly between a first position and a second position. The PCM further includes a plurality of hydraulic fluid supply lines coupled in flow communication between the hydraulic actuator and a hydraulic fluid transfer sleeve, the hydraulic fluid transfer sleeve configured to transfer a flow of pressurized hydraulic fluid across a gap between a stationary member of the hydraulic fluid transfer sleeve and a rotatable member of the hydraulic fluid transfer sleeve.

15 Claims, 4 Drawing Sheets

(51) Int. Cl.
*F01D 5/02* (2006.01)
*F01D 15/00* (2006.01)

(52) U.S. Cl.
CPC ...... *F05D 2220/32* (2013.01); *F05D 2240/30* (2013.01); *F05D 2260/76* (2013.01); *F05D 2270/64* (2013.01)

(58) Field of Classification Search
USPC .................................................. 416/157 A
See application file for complete search history.

(56) References Cited

U.S. PATENT DOCUMENTS

| | | | | |
|---|---|---|---|---|
| 4,738,589 | A * | 4/1988 | Wright | B64C 11/306 |
| | | | | 416/127 |
| 4,934,901 | A | 6/1990 | Duchesneau | |
| 5,152,668 | A | 10/1992 | Bulman et al. | |
| 5,154,372 | A | 10/1992 | Hora et al. | |
| 5,174,716 | A | 12/1992 | Hora et al. | |
| 5,242,265 | A | 9/1993 | Hora et al. | |
| 5,836,743 | A | 11/1998 | Carvalho et al. | |
| 8,336,290 | B2 * | 12/2012 | Glynn | B64C 11/38 |
| | | | | 416/157 B |
| 8,757,975 | B2 | 6/2014 | Swift et al. | |
| 8,834,119 | B2 | 9/2014 | Balk et al. | |
| 8,985,954 | B2 | 3/2015 | Balk et al. | |
| 2007/0212220 | A1 * | 9/2007 | Perkinson | B64C 11/303 |
| | | | | 416/46 |
| 2007/0212221 | A1 | 9/2007 | Carvalho et al. | |
| 2010/0014976 | A1 * | 1/2010 | Arel | B64C 11/38 |
| | | | | 416/117 |
| 2014/0154076 | A1 | 6/2014 | Belmonte et al. | |
| 2014/0193253 | A1 * | 7/2014 | Carvalho | B64C 11/385 |
| | | | | 416/1 |

FOREIGN PATENT DOCUMENTS

| | | |
|---|---|---|
| GB | 1 296 062 A | 11/1972 |
| WO | 2015/044572 A1 | 4/2015 |

OTHER PUBLICATIONS

U.S. Appl. No. 14/679,096, filed Apr. 6, 2015, entitled Fan Bearings for a Turbine Engine.

U.S. Appl. No. 14/708,353, filed May 11, 2015, entitled Variable-Pitch Rotor With Remote Counterweights.

U.S. Appl. No. 14/747,132, filed Jun. 23, 2015, entitled Trunnion Retention For a Turbine Engine.

First Office Action and Search issued in connection with corresponding CN Application No. 201610960770.X dated Mar. 8, 2018.

Extended European Search Report and Opinion issued in connection with corresponding EP Application No. 16196834.2 dated Mar. 7, 2017.

Office Action issued in connection with corresponding CA Application No. 2945988 dated Oct. 6, 2017.

* cited by examiner

CENTERLINE-MOUNTED HYDRAULIC PITCH CHANGE MECHANISM ACTUATOR

BACKGROUND

The field of the disclosure relates generally to gas turbine engines and, more particularly, to a centerline-mounted hydraulic pitch change mechanism actuator.

At least some known aircraft include gas turbine engines, which include a power turbine driving counter-rotatable propeller rotors. The power turbine is powered by a gas generator. The rotors drive a set of fan blades. The pitch of these fan blades facilitates control of the thrust of the engine. At least some known engines include multiple actuators configured to control the pitch of individual blades. In such systems, movement of the blades may not be uniform or simultaneous, which may decrease the efficiency of such a system, and such systems may be quite complex. Moreover, some known systems provide one or more actuators (or other pitch change mechanisms) that are asymmetrically disposed about an engine centerline of the engine, which may necessitate more complex or additional bearing interfaces.

Some known pitch control mechanisms include counterweights configured to affect the position or pitch of the blades, particularly in low fluid-pressure conditions. At least some of these systems mount the counterweights directly to blade-retention components. Such an arrangement may be problematic for fan assemblies with low fan hub radius ratios, because counterweight effectiveness is based on distance of a counterweight to a blade pitch change axis. As space between adjacent blades becomes limited at the hub, counterweights may be very heavy and inefficient. Alternatively, some known variable pitch fan systems use a pitch-lock system, which retains each blade at the angle the blade had when the pitch change mechanism lost adequate fluid pressure. If neither a counterweight nor a pitch-lock system is included, the blades could swing to a "fine" position in the event of loss of fluid pressure, which can unload a load torque on the turbine driving the fan.

BRIEF DESCRIPTION

In one aspect, a pitch control mechanism (PCM) for controlling the pitch of blades of a fan assembly having a centerline axis of rotation is provided. The PCM includes a hydraulic actuator positioned axisymmetric with respect to the fan assembly and configured to angularly displace the blades of the fan assembly between a first position and a second position, and a plurality of hydraulic fluid supply lines coupled in flow communication between the hydraulic actuator and a hydraulic fluid transfer sleeve. The hydraulic fluid transfer sleeve is configured to transfer a flow of pressurized hydraulic fluid across a gap between a stationary member of the hydraulic fluid transfer sleeve and a rotatable member of the hydraulic fluid transfer sleeve.

In another aspect, a method of controlling a pitch of blades of a fan assembly having a centerline axis of rotation is provided. The method includes positioning a hydraulic actuator axisymmetric with respect to the fan assembly, coupling a plurality of hydraulic fluid supply lines in flow communication with the hydraulic actuator and a hydraulic fluid transfer sleeve, transferring a flow of pressurized hydraulic fluid across a gap between a stationary member of the hydraulic fluid transfer sleeve and a rotatable member of the hydraulic fluid transfer sleeve, and angularly displacing, using the hydraulic actuator, the blades of the fan assembly between a first position and a second position.

In yet another aspect, a turbofan engine is provided. The turbofan engine includes a core engine including a multi-stage compressor, a fan assembly powered by a power turbine driven by gas generated in the core engine, and a pitch control mechanism (PCM) for controlling the pitch of blades of the fan assembly and having a centerline axis of rotation. The PCM includes a hydraulic actuator positioned axisymmetric with respect to the fan assembly and configured to angularly displace the blades of the fan assembly between a first position and a second position, and a plurality of hydraulic fluid supply lines coupled in flow communication between the hydraulic actuator and a hydraulic fluid transfer sleeve. The hydraulic fluid transfer sleeve is configured to transfer a flow of pressurized hydraulic fluid across a gap between a stationary member of the hydraulic fluid transfer sleeve and a rotatable member of the hydraulic fluid transfer sleeve.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the pitch change mechanism (PCM) described herein provide a cost-effective method for rotating the blades of a fan assembly around a pitch axis. The PCM includes a hydraulic actuator, which may include a rotary hydraulic actuator. To eliminate the need for duplex bearings in a variable pitch fan assembly including a hydraulic actuator, which thereby facilitates reducing a complexity of the fan assembly, the hydraulic actuator must rotate with the fan assembly. More particularly, the hydraulic actuator described herein is disposed axisymmetrically about an engine centerline, and therefore rotates symmetrically thereabout with the fan assembly. The PCM further includes a remote counterweight system, wherein the arrangement of the remote counterweight system facilitates decreasing a fan hub radius ratio.

Figure 1:
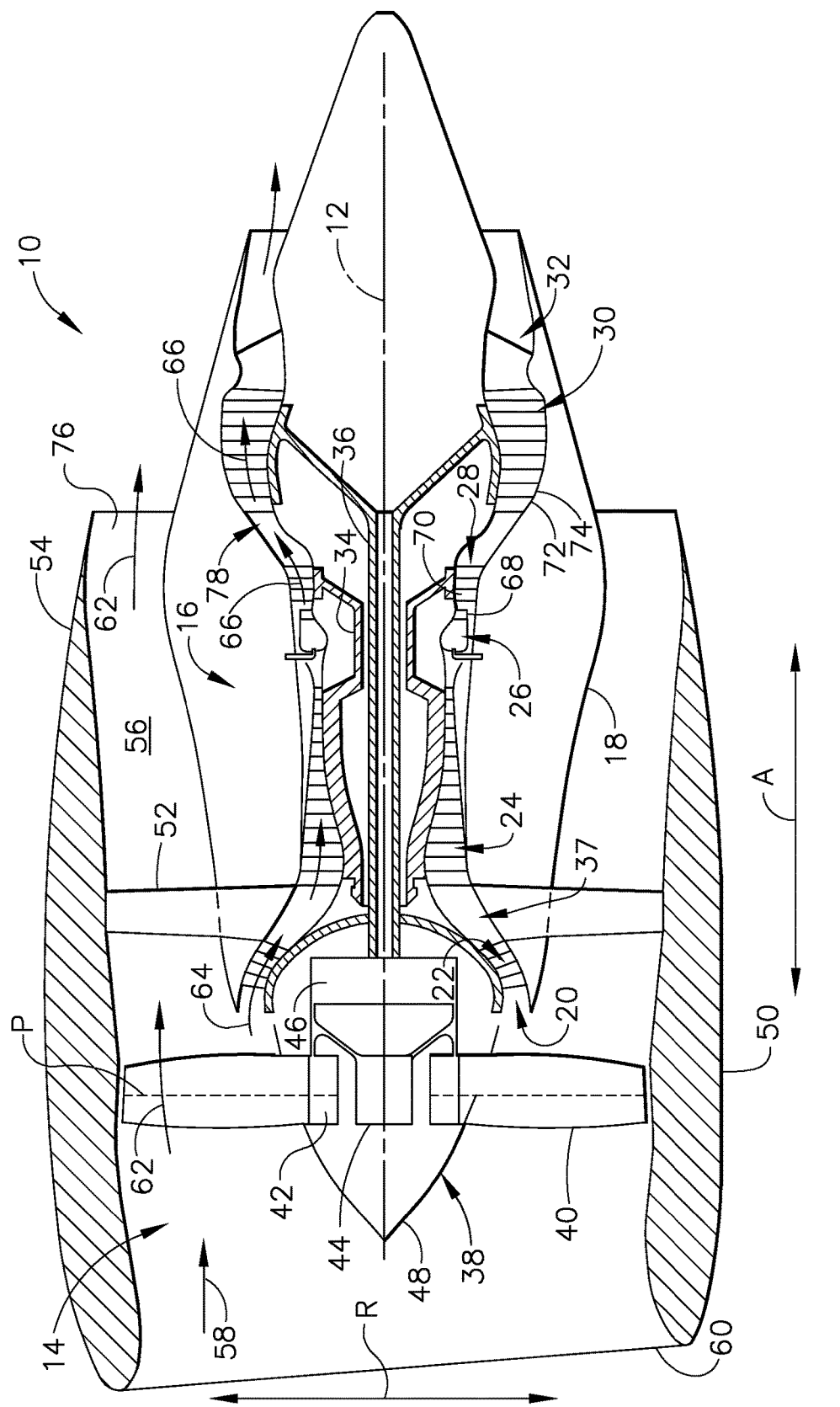
FIG. 1 is a schematic illustration of an exemplary gas turbine engine having a fan assembly in accordance with an example embodiment of the present disclosure.

FIG. 1 is a schematic cross-sectional view of a gas turbine engine 10 in accordance with an exemplary embodiment of the present disclosure. In the example embodiment, gas turbine engine 10 is embodied in a high-bypass turbofan jet engine. As shown in FIG. 1, turbofan engine 10 defines an axial direction A (extending parallel to a longitudinal centerline 12 provided for reference) and a radial direction R. In general, turbofan 10 includes a fan assembly 14 and a core turbine engine 16 disposed downstream from fan assembly 14.

In the example embodiment, core turbine engine 16 includes an approximately tubular outer casing 18 that defines an annular inlet 20. Outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects HP turbine 28 to HP compressor 24. A low pressure (LP) shaft or spool 36 drivingly connects LP turbine 30 to LP compressor 22. The compressor section, combustion section 26, the turbine section, and nozzle section 32 together define a core air flowpath 37.

In the example embodiment, fan assembly 14 includes a variable pitch fan 38 having a plurality of fan blades 40 coupled to a disk or fan hub 42 in a spaced apart relationship. Fan blades 40 extend radially outwardly from fan hub 42. A pitch change mechanism (PCM) 44 is configured to collectively vary the pitch of fan blades 40 in unison about a pitch axis P. In other embodiments, each fan blade 40 is rotatable relative to fan hub 42 by virtue of fan blades 40 being operatively coupled to PCM 44 configured to vary the pitch of fan blades 40. Fan blades 40, fan hub 42, and PCM 44 are together rotatable about longitudinal axis 12 by LP shaft 36 across a power gear box 46. Power gear box 46 includes a plurality of gears for adjusting the rotational speed of fan 38 relative to LP shaft 36 to a more efficient rotational fan speed.

Fan hub 42 is covered by rotatable front hub 48 aerodynamically contoured to promote an airflow through the plurality of fan blades 40. Additionally, fan assembly 14 includes an annular fan casing or outer nacelle 50 that circumferentially surrounds fan 38 and/or at least a portion of core turbine engine 16. In the example embodiment, nacelle 50 is configured to be supported relative to core turbine engine 16 by a plurality of circumferentially-spaced outlet guide vanes 52. Moreover, a downstream section 54 of nacelle 50 may extend over an outer portion of core turbine engine 16 so as to define a bypass airflow passage 56 therebetween. In an alternative embodiment, fan assembly 14 does not include nacelle 50 or outlet guide vanes 52, or, in other words, may include ducted or unducted embodiments of engine 10.

During operation of turbofan engine 10, a volume of air 58 enters turbofan engine 10 through an associated inlet 60 of nacelle 50 and/or fan assembly 14. As volume of air 58 passes across fan blades 40, a first portion 62 of volume of air 58 is directed or routed into bypass airflow passage 56 and a second portion 64 of volume of air 58 is directed or routed into core air flowpath 37, or more specifically into LP compressor 22. A ratio between first portion 62 and second portion 64 is commonly referred to as a bypass ratio. The pressure of second portion 64 is then increased as it is routed through high pressure (HP) compressor 24 and into combustion section 26, where it is mixed with fuel and burned to provide combustion gases 66.

Combustion gases 66 are routed through HP turbine 28 where a portion of thermal and/or kinetic energy from combustion gases 66 is extracted via sequential stages of HP turbine stator vanes 68 that are coupled to outer casing 18 and HP turbine rotor blades 70 that are coupled to HP shaft or spool 34, thus causing HP shaft or spool 34 to rotate, which then drives a rotation of HP compressor 24. Combustion gases 66 are then routed through LP turbine 30 where a second portion of thermal and kinetic energy is extracted from combustion gases 66 via sequential stages of LP turbine stator vanes 72 that are coupled to outer casing 18 and LP turbine rotor blades 74 that are coupled to LP shaft or spool 36, which drives a rotation of LP shaft or spool 36 and LP compressor 22 and/or rotation of fan 38.

Combustion gases 66 are subsequently routed through jet exhaust nozzle section 32 of core turbine engine 16 to provide propulsive thrust. Simultaneously, the pressure of first portion 62 is substantially increased as first portion 62 is routed through bypass airflow passage 56 before it is exhausted from a fan nozzle exhaust section 76 of turbofan 10, also providing propulsive thrust. HP turbine 28, LP turbine 30, and jet exhaust nozzle section 32 at least partially define a hot gas path 78 for routing combustion gases 66 through core turbine engine 16.

Turbofan engine 10 is depicted in FIG. 1 by way of example only, and that in other exemplary embodiments, turbofan engine 10 may have any other suitable configuration including for example, a turboprop engine.

Figure 2:
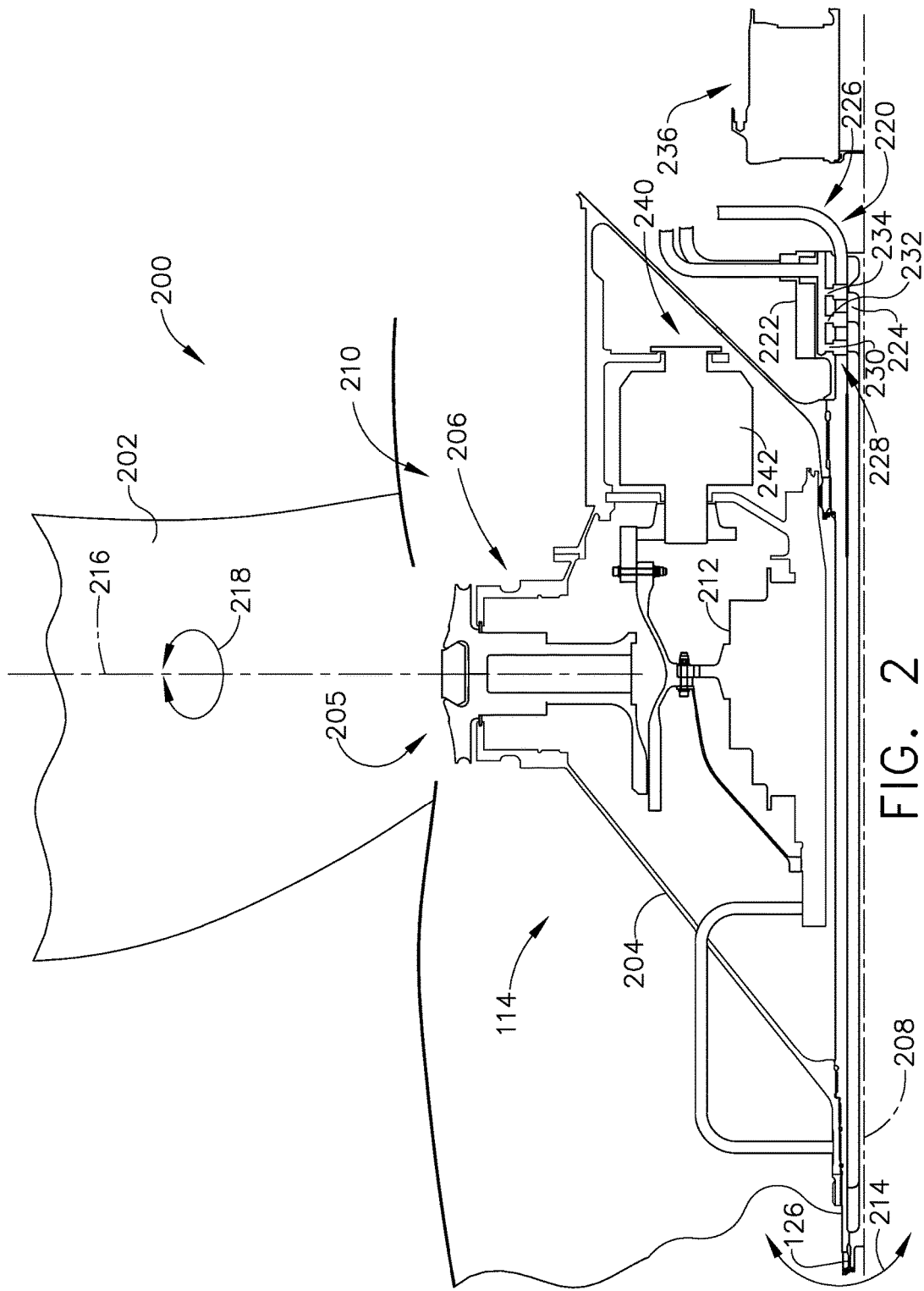
FIG. 2 is a cross-sectional view of a portion of a fan assembly that may be implemented in the gas turbine engine shown in FIG. 1.

FIG. 2 is a cross-sectional view of a portion 200 of a fan assembly 114, which may be similar to fan assembly 14 (shown in FIG. 1). Fan assembly 114 includes a plurality of blades 202 (only one blade is 202 shown, for clarity, which may be similar to blades 40, shown in FIG. 1) mounted on a rotatable frame 204. More specifically, blades 202 are retained within blade retention mechanisms 205 of an annular fan hub 206. Moreover, blades 202 are disposed symmetrically about a shaft 126 (which may be similar to LP shaft 36, shown in FIG. 1). Shaft 126 defines a shaft axis 208, which is co-axial with an engine centerline. Accordingly, shaft axis 208 may be referred to herein as "engine centerline 208" Fan assembly 114 further includes a pitch control mechanism (PCM) 210 (which may be similar to PCM 44, shown in FIG. 1) for controlling a pitch of blades 202. PCM 210 includes a single master hydraulic actuator 212 positioned axisymmetric with respect to centerline 208 and fan assembly 114. In the illustrated embodiment, hydraulic actuator 212 is a rotary actuator configured to rotate about an axis defined by engine centerline 208, as indicated by arrow 214. In one embodiment, hydraulic actuator 212 circumscribes shaft 126.

Hydraulic actuator 212 is configured to angularly displace blades 202 of fan assembly 114 between a first position and a second position. More specifically, hydraulic actuator 212 drives rotation of blades 202 about respective pitch axes 216. In the illustrated embodiment, hydraulic actuator 212 is configured to angularly displace blades 202 upon rotation of hydraulic actuator 212. The angular displacement of blades 202 around pitch axes 216 is indicated generally by arrow 218.

PCM 210 also includes a hydraulic fluid transfer system 211, including a power gearbox 236 (which may be similar to gearbox 46, shown in FIG. 1) configured to drive hydraulic fluid (e.g., hydraulic oil) through shaft 126 to hydraulic actuator 212. Gearbox 236 may be a star gearbox, such that hydraulic fluid is channeled therethrough, a planetary gearbox, in which the hydraulic is transferred therearound, or another suitable gearbox configuration. Hydraulic fluid transfer system 211 also includes a hydraulic fluid transfer sleeve 220, such as, for example, a hydraulic oil transfer "slip ring," in fluid communication with gearbox 236. Hydraulic transfer sleeve 220 includes a stationary member 222, fixed relative to fan assembly 114, and a rotatable member 224, which rotates with hydraulic actuator 212. Hydraulic fluid transfer sleeve 220 is configured to transfer a flow of pressurized hydraulic fluid, for example, hydraulic oil, across a gap 226 between stationary member 222 and rotatable member 224. In the example embodiment, PCM 210 further includes a plurality of hydraulic fluid supply lines 228 coupled in flow communication between hydraulic actuator 212 and hydraulic fluid transfer sleeve 220. As described further herein, the plurality of fluid supply lines 228 includes a first supply line 230, configured to channel pressurized fluid to hydraulic actuator 212 to increase pitch of blades 202, a second supply line 232, configured to channel pressurized fluid to hydraulic actuator 212 to decrease pitch of blades 202, and a third supply line 234 configured to facilitate draining at least a portion of hydraulic actuator 212.

As described further herein, PCM 210 includes a remote counterweight system 240. Remote counterweight system 240 includes a plurality of counterweights 242 configured to affect a position of blades 202, for example, when fluid pressure in PCM 210 is outside a predetermined range. Remote counterweight system 240 is remote from blade retention mechanisms 205. In low fan hub radius ratio fan assemblies, such as fan assembly 114, blade retention mechanisms (e.g., blade retention mechanisms 205) and counterweight systems and/or failsafe mechanisms (e.g., remote counterweight system 240) contribute to fan hub radius ratio. By reducing a diameter of fan hub 206 (and, thereby, a fan hub radius ratio), propulsive efficiency of engine 10 (shown may be increase, facilitating improved overall engine performance. Moreover, counterweight effectiveness is based on distance of a counterweight (e.g., a counterweight 242) to a blade pitch axis of rotation (e.g., pitch axis 216). As space between adjacent blades 202 becomes limited at fan hub 206, traditional counterweights attached directly to the fan hub, with counterweight rotation about axis 216, may be very heavy and inefficient. Remote counterweight system 240 facilitates overcoming such issues by allowing counterweights 242 to act upon actuator 212 via a mechanical attachment to a unison ring 430 (shown and described with respect to FIG. 4), facilitating reducing a diameter of fan hub 206.

It should be understood that in other embodiments of engine 10 (shown in FIG. 1), more than one row of blades may be included in fan assembly 114, for example, a second row of blades counter-rotatable with respect to blades 202. In such alternative embodiments, a second PCM similar to PCM 210 described herein may serve the second row of blades.

Figure 3:
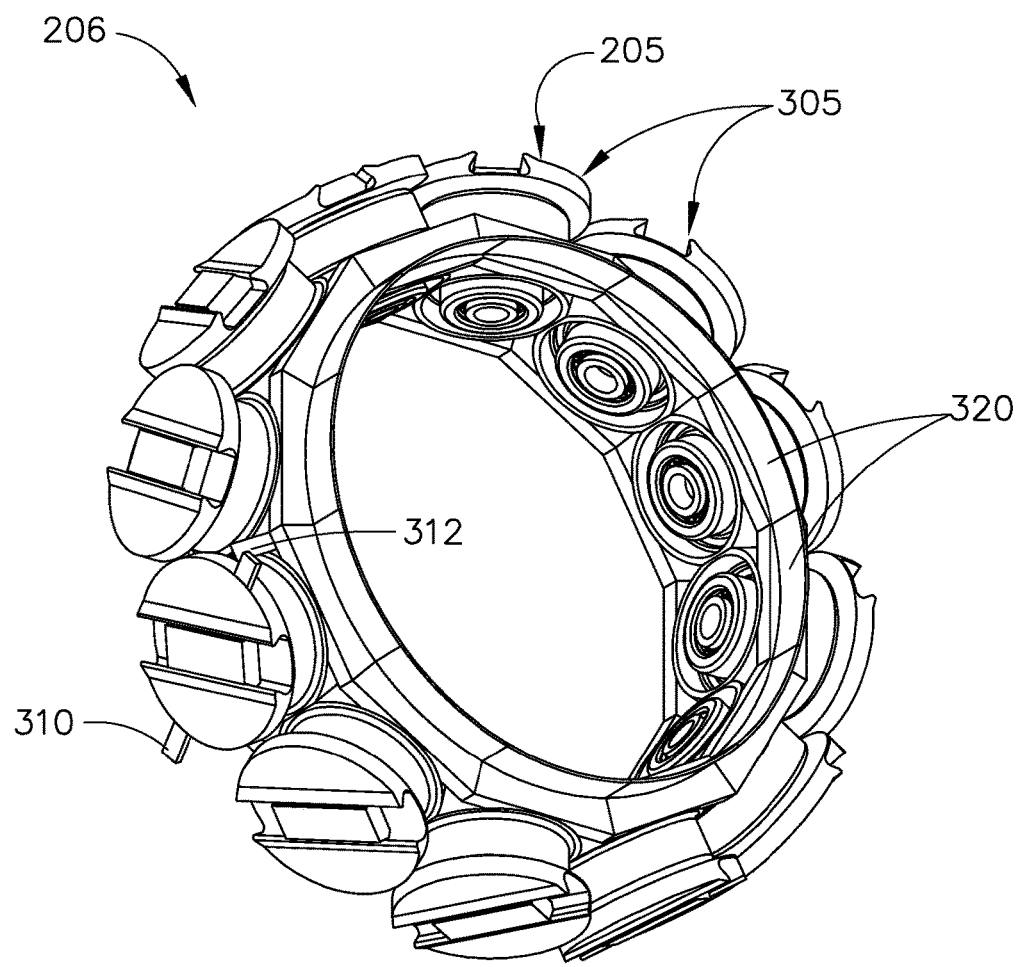
FIG. 3 is a perspective view of a fan hub of the fan assembly shown in FIG. 2.

FIG. 3 is a perspective view of fan hub 206 (shown in FIG. 2) of fan assembly 114 (shown in FIG. 2). Fan hub 206 includes a plurality of hub segments 302 that are rigidly coupled together or integrally molded together in a generally annular shape (e.g., a polygonal shape). One fan blade 202 (shown in FIG. 2) is to be coupled to each hub segment 302 at a blade retention mechanism 205. More specifically, in the example embodiment, each blade retention mechanism 205 is a trunnion 305 that facilitates retaining an associated fan blade 202 on hub 206 during rotation of hub 206 (i.e., trunnion 305 facilitates providing a load path to hub 206 for the centrifugal load generated by blades 202 during rotation about engine centerline 208), while rendering the associated blade 202 rotatable relative to hub 206 about pitch axis 216. Each hub segment 302 includes one of trunnions 305, configured to retain a blade 202, and at least one bearing (not shown), configured to facilitate rotation of trunnion 305 in hub segment 302. The at least one bearing may include any suitable bearing configuration, including one or more roller bearings, tapered bearings, and/or any suitable bearing configured to facilitate rotating of trunnion 305.

Returning now to FIG. 3, in some embodiments, a predetermined pitch or rotational range of blades 202 may be imposed. For example, blades 202 may rotate ±90°, ±60°, ±30°, or any other symmetrical range, or an asymmetrical range such as +90° to −60°, about a 0° position (as shown by blade 202 in FIG. 2). In one embodiment, blades 202 traverse a total angle up to about 130° to accommodate incidence angle swings during operation and generate reverse thrust on the ground. In such embodiments, PCM 210 (also shown in FIG. 2) includes one or more mechanical or hydraulic stops to limit the rotational ranges of blades 202. In the illustrated embodiment, each trunnion 305 includes at least one "stop flange" 310. Each hub segment 302 includes at least one corresponding "stop post" 312. Stop flange 310 and stop post 312 cooperate to form a mechanical stop for a corresponding trunnion 305. More specifically, trunnion 305 is free to rotate blade 202 about pitch axis 216 until one of stop flanges 310 contacts one of stop posts 312, thereby preventing further rotation of trunnion 305. It should be understood that any suitable mechanical stop may be implemented, and as such is not limited to the "flange and post" embodiment illustrated herein. In other embodiments, a hydraulic stop is implemented at hydraulic actuator 212. For example, a hydraulic stop such as a valve, gate, or barrier may be positioned at one or more ports or inlets of hydraulic actuator 212 when blades 202 have reached a limit of pitch range. The hydraulic stop thereby prevents further rotation of hydraulic actuator 212, effectively locking hydraulic actuator 212 and, thereby, blades 202 in place.

Figure 4:
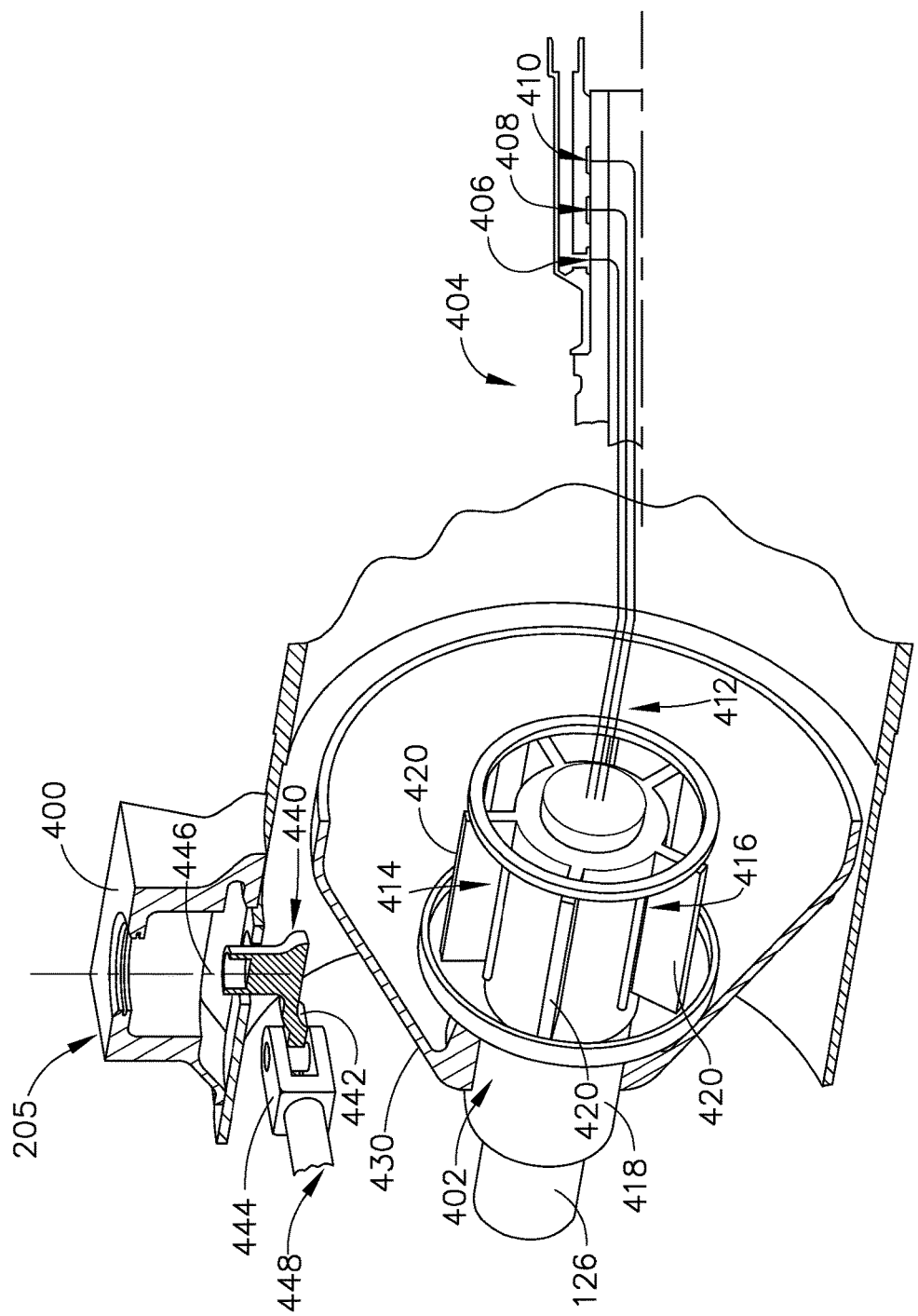
FIG. 4 is a perspective schematic view of a portion of an alternative embodiment of the fan assembly shown in FIG. 2.

FIG. 4 is a perspective schematic view of a portion of an alternative embodiment of fan assembly 114 (shown in FIG. 2). In the illustrated embodiment, hydraulic actuator 212 is a paddle-type hydraulic actuator 400. Paddle-type hydraulic actuator 400 further includes a drum 402 and a port assembly 404. Port assembly 404 includes a plurality of hydraulic ports 406, 408, 410; a plurality of hydraulic fluid receiving plenums 412; a plurality of hydraulic fluid channels 414 (which may be similar to supply lines 228, shown in FIG. 2);

a plurality of hydraulic fluid transfer tubes 416; a pitch actuator 418; and a plurality of pitch actuator vanes or paddles 420. Hydraulic actuator 400 is rotationally coupled to a unison ring 430, which is configured to be mechanically coupled to each of trunnions 305 (shown in FIG. 3) and to hydraulic actuator 400 to rotates all of trunnions 305 simultaneously. Pitch actuator paddles 420 extend radially outward from shaft 126 to an inner diameter of drum 402. Hydraulic ports 406, 408, and 410 include increase hydraulic port 406, drain hydraulic port 408, and decrease hydraulic port 410. Hydraulic fluid receiving plenums 412, hydraulic fluid channels 414, and hydraulic fluid transfer tubes 416 each include at least one element thereof in flow communication with one of increase hydraulic port 406, drain hydraulic port 408, and decrease hydraulic port 410, such that hydraulic fluid is channeled appropriately to hydraulic actuator 212 to rotate hydraulic actuator 400 and increase or decrease the pitch of blades 202.

In one embodiment, paddle-type hydraulic actuator 400 is configured to vary the pitch of fan blades 202 via system of bell cranks 440. Bell cranks 440 include a first portion 442 and a second portion 444. Bell cranks 440 rotate about an axis 446 (coaxial with pitch axis 216). In one embodiment, one of bell cranks 440 is drivably coupled to one of blade retention mechanisms 205 (e.g., trunnion 305, as shown in FIG. 3). More specifically, first portion 442 of bell crank 440 is coupled to trunnion 305, and second portion 444 of bell crank 440 is coupled to or proximate to at least one of paddles 420 of hydraulic actuator 400 and/or to unison ring 430 (e.g., via a yoke mechanism 448). During operation, paddle 420 actuates bell crank 440, which translates the motion of paddle 420 into motion of trunnion 305, facilitating rotating trunnion 305 to angularly displace blade 202.

In the example embodiment, hydraulic actuator 212 and/or paddle type hydraulic actuator 400 facilitates a mechanical linkage to each of trunnions 305, for example, via unison ring 430, such that all blades 202 are rotated uniformly and simultaneously about respective pitch axes 216 with the movement (e.g., rotation) of hydraulic actuator 212, 400. Rotating blades 202 uniformly and simultaneously may facilitate increasing an efficiency and reliability of fan assembly 114. Accordingly, it should be understood that hydraulic actuator 212 is not limited to paddle-type hydraulic actuator 400, and that hydraulic actuator 212 may be any suitable type of actuator configured to provide such a mechanical linkage. For example, in an alternative embodiment, hydraulic actuator 212 is a linear actuator configured to translate parallel to the axis defined by engine centerline 208. In such an embodiment, PCM 210 includes alternative mechanical linkages from the linear actuator to each of trunnions 305 to facilitate uniform and simultaneous pitch change of all blades 202. In another alternative embodiment, hydraulic actuator 212 may include a plurality of actuators mounted to a stationary frame of fan assembly 114. In such an embodiment, PCM 210 includes a stationary-to-rotating bearing interface to facilitate control of the pitch of blades 202 by the plurality of actuators through the bearing interface.

In the example embodiment, counterweights 242 of remote counterweight system 240 are mechanically coupled to trunnions 305 via unison ring 430. When hydraulic fluid pressure in PCM 210 is outside a predetermined range, for example, a very low fluid pressure, remote counterweight system 240 is configured to position counterweights 242 such that counterweights 242 affect the position of blades 202. More specifically, counterweights 242 are configured to rotate trunnions 305, and, therefore, rotate blades 202 to a predetermined pitch. In the example embodiment, counterweights 242 position blades 202 in an approximate feather pitch upon loss of fluid pressure. Such a feather position places a maximum loading torque on turbine 30 (shown in FIG. 1) that is driving fan assembly 114. Additionally or alternatively, counterweights 242 may be configured to facilitate rotation of trunnions 305 via unison ring 430, with or without the above-described fail-safe capabilities.

The above-described pitch control mechanisms provide a cost-effective method for increasing an efficiency and reliability of turbine engine fan assemblies. Specifically, to achieve simultaneous and uniform pitch change of fan blades of a fan assembly, a single hydraulic actuator configured to rotate axisymmetrically with the fan assembly is provided. In addition, a remote counterweight system provides an improvement over other counterweight systems that facilitates reducing a diameter /of the fan assembly and decreasing a weight of the counterweights in comparison to non-remote counterweight systems, while facilitating increasing the reliability of the fan assembly by positioning the blades in a safe position in the event of a hydraulic fluid pressure loss. Providing a single master actuator may facilitate reduction of the complexity of pitch change mechanisms of turbine engines, thereby facilitating improving efficiency and/or facilitating decreasing weight of the fan assembly.

Exemplary embodiments of pitch change mechanisms (PCMs) including a master hydraulic rotary actuator are described above in detail. The PCMs and actuators, and methods of operating such systems and devices, are not limited to the specific embodiments described herein, but rather, components of systems and/or steps of the methods may be utilized independently and separately from other components and/or steps described herein. For example, the methods may also be used in combination with other systems requiring fan assemblies having fan blade pitch change capability, and are not limited to practice with only the systems and methods as described herein. Rather, the exemplary embodiment can be implemented and utilized in connection with many other engine applications that are currently configured to receive and accept fan assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pitch control mechanism (PCM) for controlling the pitch of blades of a fan assembly of a gas turbine engine having a centerline axis of rotation, the PCM comprising:
   a single, master hydraulic rotary actuator positioned axisymmetric with respect to the centerline axis of rotation and configured for angular movement about the centerline axis of rotation to angularly displace the blades of the fan assembly between a first position and a second position, the hydraulic rotary actuator actuating a bell crank and yoke system configured to convert the angular displacement of the actuator to angular displacement of the blades about respective pitch axes; and a plurality of hydraulic fluid supply lines coupled in flow communication between the hydraulic rotary actuator and a hydraulic fluid transfer sleeve, the hydraulic fluid transfer sleeve configured to transfer a flow of pressurized hydraulic fluid across a gap between a stationary member of the hydraulic fluid transfer sleeve and a rotatable member of the hydraulic fluid transfer sleeve.

2. The PCM of claim 1, wherein the hydraulic rotary actuator circumscribes a shaft drivingly coupled to the fan assembly.

3. The PCM of claim 1, wherein the hydraulic rotary actuator comprises a paddle-type actuator.

4. The PCM of claim 3, wherein the paddle-type actuator comprises a plurality of paddles.

5. The PCM of claim 1, wherein the hydraulic rotary actuator is operatively coupled to a plurality of blade trunnions spaced circumferentially about a hub of the fan assembly, the blade trunnions configured to support a respective blade and to transmit loads from the respective blade to the hub.

6. The PCM of claim 5, wherein each of the blade trunnions is mechanically coupled to a counterweight configured to affect the pitch of the respective blade.

7. A method of controlling a pitch of blades of a fan assembly of a gas turbine engine having a centerline axis of rotation, the method comprising:
positioning a single, master hydraulic rotary actuator axisymmetric with respect to the centerline axis of rotation, the hydraulic rotary actuator being configured for angular movement about the centerline axis of rotation, the hydraulic rotary actuator actuating a bell crank and yoke system configured to convert the angular displacement of the actuator to angular displacement of the blades about respective pitch axes;
coupling a plurality of hydraulic fluid supply lines in flow communication with the hydraulic rotary actuator and a hydraulic fluid transfer sleeve;
transferring a flow of pressurized hydraulic fluid across a gap between a stationary member of the hydraulic fluid transfer sleeve and a rotatable member of the hydraulic fluid transfer sleeve; and
angularly displacing, using the hydraulic rotary actuator, the blades of the fan assembly between a first position and a second position.

8. The method of claim 7, wherein positioning the hydraulic rotary actuator axisymmetric with respect to the centerline axis of rotation comprises positioning the hydraulic rotary actuator to circumscribe a shaft drivingly coupled to the fan assembly.

9. The method of claim 7, further comprising:
operatively coupling the hydraulic rotary actuator to a plurality of blade trunnions spaced circumferentially about a hub of the fan assembly, the blade trunnions configured to support a respective blade and to transmit loads from the respective blade to the hub; and
operatively coupling each blade trunnion to a counterweight configured to affect the pitch of the respective blade.

10. A turbofan engine having a centerline axis of rotation and comprising:
a core engine including a multistage compressor;
a fan assembly powered by a power turbine driven by gas generated in the core engine; and
a pitch control mechanism (PCM) for controlling the pitch of blades of the fan assembly and having a centerline axis of rotation, the PCM comprising:
a single, master hydraulic rotary actuator positioned axisymmetric with respect to the centerline axis of rotation and configured for angular movement about the centerline axis of rotation to angularly displace the blades of the fan assembly between a first position and a second position, the hydraulic rotary actuator actuating a bell crank and yoke system configured to convert the angular displacement of the actuator to angular displacement of the blades about respective pitch axes; and
a plurality of hydraulic fluid supply lines coupled in flow communication between the hydraulic rotary actuator and a hydraulic fluid transfer sleeve, the hydraulic fluid transfer sleeve configured to transfer a flow of pressurized hydraulic fluid across a gap between a stationary member of the hydraulic fluid transfer sleeve and a rotatable member of the hydraulic fluid transfer sleeve.

11. The turbofan engine of claim 10, wherein the hydraulic rotary actuator circumscribes a shaft drivingly coupled to the fan assembly.

12. The turbofan engine of claim 10, wherein the hydraulic rotary actuator comprises a paddle-type actuator.

13. The turbofan engine of claim 12, wherein the paddle-type actuator comprises a plurality of paddles.

14. The turbofan engine of claim 10, wherein the hydraulic rotary actuator is operatively coupled to a plurality of blade trunnions spaced circumferentially about a hub of the fan assembly, the blade trunnions configured to support a respective blade and to transmit loads from the respective blade to the hub.

15. The turbofan engine of claim 14, wherein the blade trunnion is mechanically coupled to a counterweight configured to affect the pitch of the respective blade.

* * * * *